US007584946B2

(12) United States Patent
Doi

(10) Patent No.: US 7,584,946 B2
(45) Date of Patent: Sep. 8, 2009

(54) ELECTRIC POSITIONING AND CLAMPING APPARATUS

(75) Inventor: Takashi Doi, Tokyo (JP)

(73) Assignee: Koganei Corporation, Tokyo (JP)

( * ) Notice: Subject to any disclaimer, the term of this patent is extended or adjusted under 35 U.S.C. 154(b) by 0 days.

(21) Appl. No.: 12/177,206

(22) Filed: Jul. 22, 2008

(65) Prior Publication Data

US 2009/0026680 A1 Jan. 29, 2009

(30) Foreign Application Priority Data

Jul. 27, 2007 (JP) ............................ 2007-196300

(51) Int. Cl.
*B23Q 3/06* (2006.01)
*B25B 5/00* (2006.01)

(52) U.S. Cl. ......................... 269/32; 269/225; 269/229; 269/89

(58) Field of Classification Search ................... 269/32, 269/24-27, 228, 91-95, 229, 225, 89, 93
See application file for complete search history.

(56) References Cited

U.S. PATENT DOCUMENTS 5,110,100 A * 5/1992 Cotton ....................... 269/244
7,182,326 B2 * 2/2007 McIntosh et al. .............. 269/32
7,516,948 B2 * 4/2009 McIntosh et al. .............. 269/32
2004/0021260 A1 * 2/2004 Migliori ...................... 269/32
2005/0012258 A1 * 1/2005 Migliori ...................... 269/32
2006/0208408 A1 * 9/2006 Migliori ...................... 269/32
2009/0026680 A1 * 1/2009 Doi ............................ 269/93

FOREIGN PATENT DOCUMENTS

JP 2003159617 6/2003
JP 2003165037 6/2003

* cited by examiner

*Primary Examiner*—Lee D Wilson
(74) *Attorney, Agent, or Firm*—McCormick, Paulding & Huber LLP

(57) ABSTRACT

A small-sized electric positioning and clamping apparatus is provided. A panel material is supported on a workpiece supporting face and is positioned by a locating pin being fitted into a positioning hole. A clamp arm is accommodated in a slit formed in the locating pin, and the panel material is clamped by the clamp arm. The clamp arm is coupled to a driven rod, and the driven rod is coupled to a driving rod via a compression coil spring. A cam face is formed in a cam block assembled reciprocably in a gear box, and an engagement cam contacting with the cam face is attached to the driving rod. The cam block is reciprocated by an electric motor via a reduction gear mechanism.

7 Claims, 4 Drawing Sheets

ELECTRIC POSITIONING AND CLAMPING APPARATUS

CROSS-REFERENCE TO RELATED APPLICATIONS

Applicant hereby claims foreign priority benefits under U.S.C. § 119 from Japanese Patent Application No. 2007-196300 filed on Jul. 27, 2007, the contents of which are incorporated by reference herein.

TECHNICAL FIELD OF THE INVENTION

The present invention relates to an electric positioning and clamping apparatus for positioning and fixing a panel material using a locating pin.

BACKGROUND OF THE INVENTION

An automobile body is formed by joining a plurality of panel materials by spot welding, and it is necessary to position and clamp various panel materials configuring the automobile body in performing the spot welding. Therefore, in order to position and clamp the panel materials, a plurality of positioning and clamping apparatuses are attached to a welding stage arranged in an automobile manufacturing line. On a conveying truck which conveys the panel materials, as described in Patent Documents 1 (Japanese Patent Application Laid-Open Publication No. 2003-159617) and 2 (Japanese Patent Application Laid-Open Publication No. 2003-165037), the plurality of positioning and clamping apparatuses are mounted in order to clamp the panel materials. Further, positioning and clamping of the panel materials by the positioning and clamping apparatus are performed by mounting the positioning and clamping apparatus to a tip of a robot arm to operate and move the robot arm.

In each of above cases, the conventional positioning and clamping apparatus has the locating pin which is fitted in a positioning hole formed in the panel material as a workpiece, and the panel material is intended to be positioned by fitting the locating pin into the positioning hole. A clamp arm is assembled in a slit formed in the locating pin in order to clamp the panel material, so that when the panel material is clamped, the clamp arm is caused to protrude from an interior of the slit.

SUMMARY OF THE INVENTION

When a clamping apparatus for clamping the panel materials is equipped with the conveying truck for conveying the panel materials, as described in Patent Documents 1 and 2, a driving source such as an electric motor or pneumatic cylinder is not equipped with the conveying truck in order to miniaturize the clamping apparatus, and the clamp arm is intended to be driven by the driving source provided to a stage for conveying-in or conveying-out of the panel material after the conveying truck stops. Meanwhile, when the clamping apparatus is disposed on the welding stage arranged in the automobile manufacturing line or is attached at a tip of the robot arm, the driving source must be provided to the clamping apparatus.

For example, when the clamping apparatus is disposed on the welding stage, one panel material is positioned using a plurality of, for example, three locating pins in order to enhance position accuracy of the panel material. Further, in the automobile manufacturing line, the plurality of panel materials are conveyed into a single welding stage in order to manufacture a plurality of vehicle types or plurality of vehicle models in a mixing manner. For example, when a plurality of kinds of panel materials are conveyed into the single welding stage, positions through which the locating pin passes are different among respective kinds of panel materials, so that the plurality of kinds of clamping apparatuses must be provided to the single welding stage so as to correspond to the kinds of the panel materials. For this reason, even when each panel material is positioned at its three locations, twenty-four clamping apparatuses are disposed on the welding stage in which eight kinds of panel materials are conveyed.

In the conventional positioning and clamping apparatuses, the clamp arm is intended to be driven by pneumatic pressure or an electric motor. Therefore, in order to drive the clamp arm, when compressed air is supplied from a pneumatic-pressure supplying source to a piston, compressed air is branched from a compressed-air supplying source such as a compressor and is supplied to the respective positioning and clamping apparatuses. When the positioning and clamping apparatuses are actuated by compressed air, a distance between a solenoid valve for controlling supply of compressed air and a piston of the positioning and clamping apparatus is different per positioning and clamping apparatus. In addition, since there is a limit to a flow rate of compressed air, when the positioning and clamping apparatuses are a pneumatic pressure actuation type utilizing compressed air as a driving medium, there is the problem that a difference in actuated timing occurs mutually among the plurality of positioning and clamping apparatuses.

Meanwhile, as described in above Patent Documents, the positioning and clamping apparatus in which the clamp arm is driven by an electric motor has been applied to a type of separating the electric motor from the positioning and clamping apparatus, similarly to a positioning and clamping apparatus mainly equipped with the conveying truck, since the electric motor must be made larger for obtaining a clamping force.

In order to assemble the electric motor serving as a driving source into the positioning and clamping apparatus, as described in above Patent Documents, a spring member for locking is disposed between a cam and a driving rod, and a spring force which has been converted via a cam pin and a cam groove is transmitted as a clamping force caused by the clamp arm. For this reason, a structure of a driving section of the clamp arm is apt to be large, so that the positioning and clamping apparatus cannot be miniaturized.

An object of the present invention is to provide an electric positioning and clamping apparatus in which an electric motor is assembled.

Another object of the present invention is to provide a small-sized electric positioning and clamping apparatus.

An electric positioning and clamping apparatus according to the present invention comprises: a workpiece supporting stand having, at its tip, a workpiece supporting face contacting with a panel material; a locating pin attached to the workpiece supporting stand so as to protrude from the workpiece supporting face, and fitted into a positioning hole formed in the panel material; a clamp arm accommodated in a slit, which is formed in the locating pin so as to be open in a diametrical direction of the locating pin, the clamp arm being swingable between a clamp position where the clamp arm protrudes from the slit to clamp the panel material between the workpiece supporting face and the clamp arm and an escape position where the clamp arm enters into the slit; a driven rod mounted to the workpiece supporting stand so as to be reciprocable axially between a retreat-limit position corresponding to the clamp position of the clamp arm and an advance-limit position corresponding to the escape position of the clamp arm, a tip of the driven rod being coupled to the clamp arm; a driving rod mounted in a gear box attached to the workpiece supporting stand so as be reciprocable axially between the retreat-limit position and the advance-limit position, the driving rod being coupled to a rear end of the driven rod; a spring member mounted between the driven rod and the driving rod, and applying a clamping force to the clamp arm via the driven rod when the driving rod is at the retreat-limit position; a cam block assembled in the gear box so as to be reciprocable in a direction of intersecting the driving rod, having a cam face contacting with an engagement cam attached to the driving rod, and causing the driving rod to be driven between the retreat-limit position and the advance-limit position; and an electric motor assembled in the gear box, and causing the cam block to reciprocate, via a reduction gear mechanism, between a clamp position corresponding to the retreat-limit position and an unclamp position corresponding to the advance-limit position.

The electric positioning and clamping apparatus according to the present invention further comprises a lock face formed in the cam block, the lock face restricting movement of the engagement cam when the cam block drives the driving rod up to the retreat-limit position.

In the electric positioning and clamping apparatus according to the present invention, the spring member is a compression coil spring assembled between an accommodating box fixed to the driving rod and a flange provided to an end portion of the driven rod inserted into the accommodating box.

In the electric positioning and clamping apparatus according to the present invention, the reduction gear mechanism is plural-stage reduction gear pairs for reducing rotation of the electric motor.

The electric positioning and clamping apparatus according to the present invention is such that a rack gear meshing with a pinion gear provided at a final stage among the plural-stage reduction gear pairs is attached to the cam block.

According to the present invention, the electric motor is used as a driving source to convert its rotation to a reciprocating motion of the cam block via the reduction gear mechanism, the clamp arm is opened and closed via the driven rod by the driving rod driven by the cam block, and the spring member for applying a clamping force to the clamp arm is mounted between the driven rod and the driving rod. Therefore, a portion of the cam block can be simply configured, and simultaneously the clamp arm can be fixed at the clamp position. For this reason, without making the positioning and clamping apparatus large, the electric motor assembled in the positioning and clamping apparatus is used as a driving source to clamp the panel material, whereby the clamping force can be applied to the panel material via the clamp arm.

The spring member is provided between the driven rod and the driving rod, and when the driving rod is at the retreat-limit position, a spring force is applied to the clamp arm. Therefore, the present invention can reliably maintain a state where the clamp arm clamps the panel member.

DESCRIPTION OF THE PREFERRED EMBODIMENTS

Figure 1:
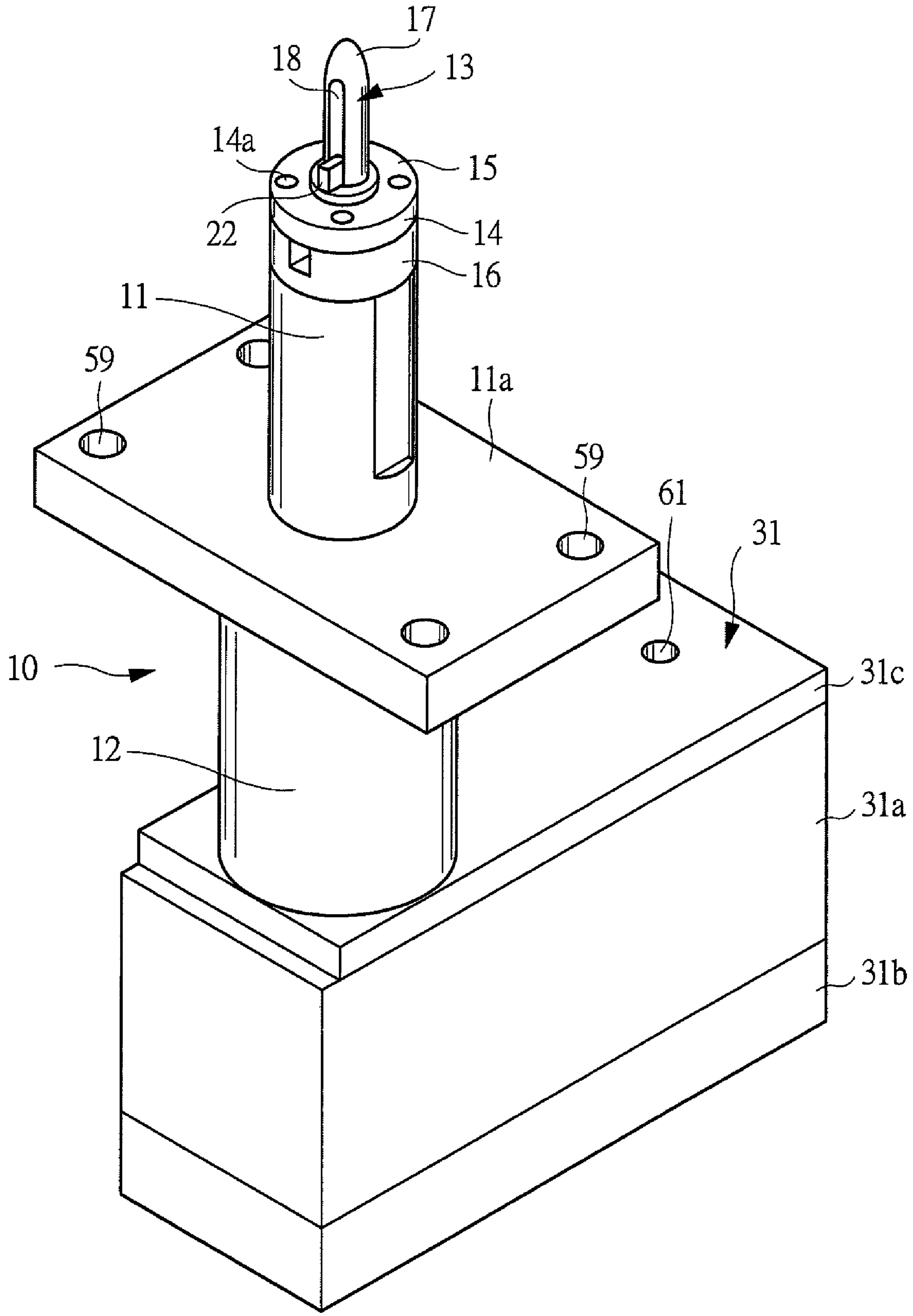
FIG. 1 is a perspective view showing an entire electric positioning and clamping apparatus.
Figure 2:
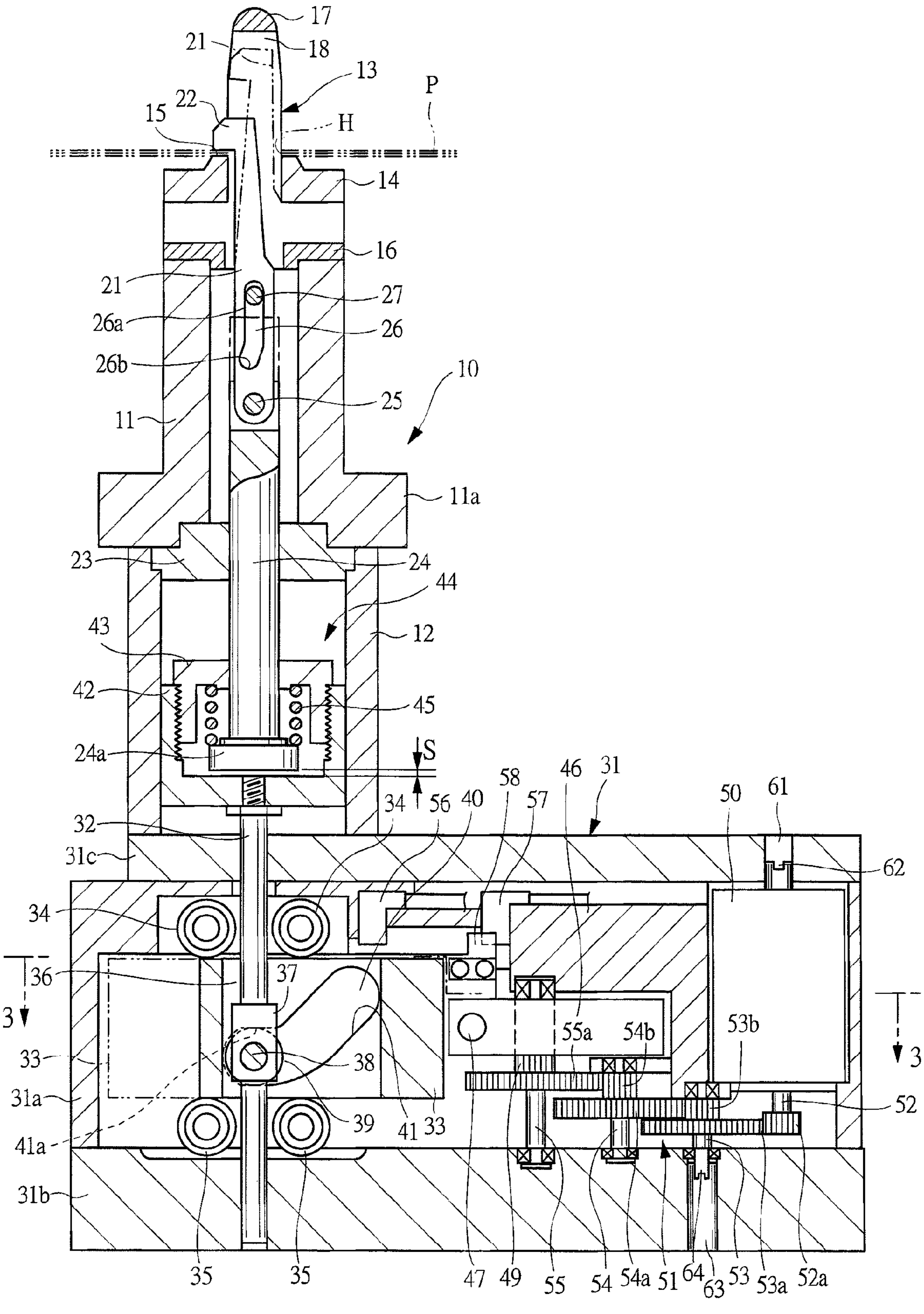
FIG. 2 is an enlarged sectional view of FIG. 1.
Figure 3:
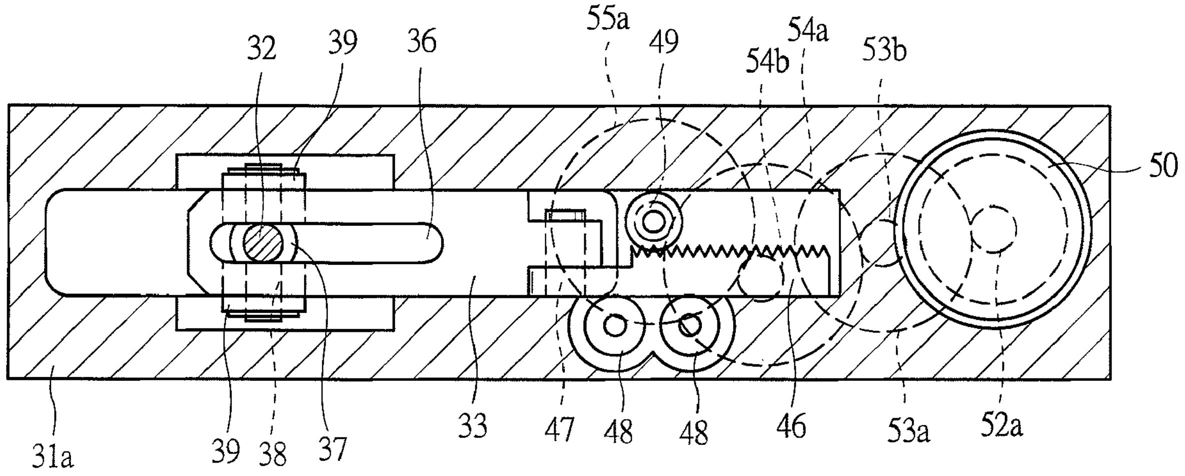
FIG. 3 is a sectional view taken along line 3-3 of FIG. 2.

An embodiment of the present invention will be described in detail below with reference to the drawings. FIG. 1 is a perspective view showing an entire electric positioning and clamping apparatus; FIG. 2 is an enlarged sectional view of FIG. 1; and FIG. 3 is a sectional view taken along line 3-3 of FIG. 2.

The electric positioning and clamping apparatus has a workpiece supporting stand 10 supporting a panel material P. The workpiece supporting stand 10 includes a cylindrical fixing pedestal 11 integrated with a rectangular pedestal plate **11*a* at a base end portion of the fixing pedestal 11, and a cylindrical coupling case 12 fixed to the pedestal plate 11*a*, wherein a locating jig 13 is disposed at a tip of the fixing pedestal 11. The locating jig 13 is attached to the fixing pedestal 11 via a workpiece supporting ring 14, and a workpiece supporting face 15 with which a panel member P contacts is provided to the workpiece supporting ring 14. In order to attach the workpiece supporting ring 14 to the fixing pedestal 11, as shown in FIG. 1, a plurality of attaching holes 14*a* are formed in the workpiece supporting ring 14, and the workpiece supporting ring 14 is fixed to the fixing pedestal 11 by bolts (not shown) assembled in the respective attaching holes 14*a***.

Figure 4:
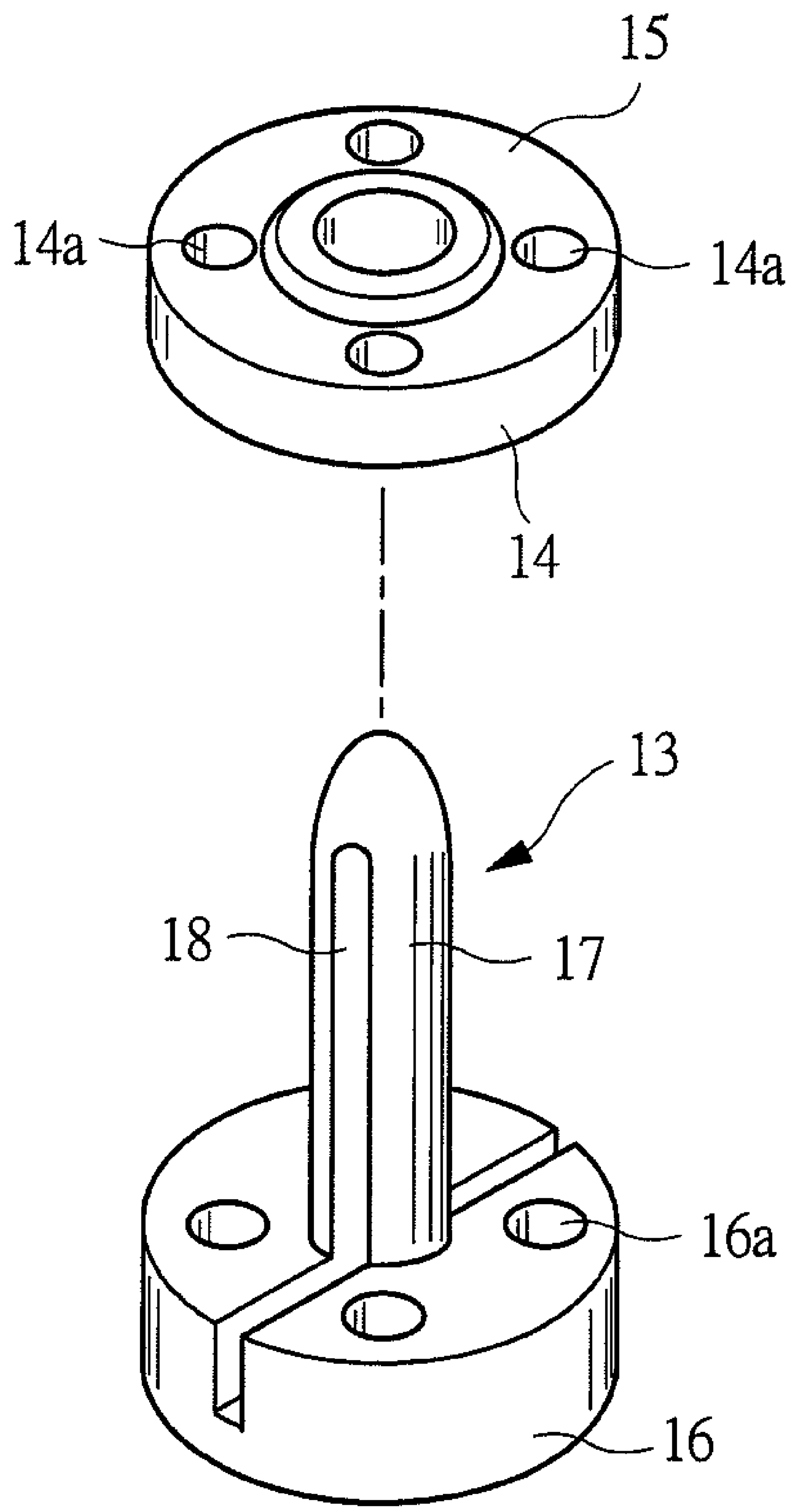
FIG. 4 is an exploded perspective view showing a locating jig and a workpiece supporting ring.

FIG. 4 is an exploded perspective view showing the locating jig 13 and the workpiece supporting ring 14. The locating jig 13 includes a circular flange 16 clamped between a tip face of the fixing pedestal 11 and the workpiece supporting ring 14, and a locating pin 17 integrated with the flange 16, wherein attaching holes **16*a* are formed in the flange 16 so as to correspond to the attaching holes 14*a* of the workpiece supporting ring 14. Accordingly, when the locating jig 13 is disposed at the tip of the fixing pedestal 11 by the workpiece supporting ring 14 to attach the workpiece supporting ring 14 and the locating jig 13 by bolts, the locating pin 17 becomes in a state of projecting from the workpiece supporting face 15 located at the tip of the workpiece supporting stand 10. By fitting, to the locating pin 17, a positioning hole H formed in the panel member P, the panel member P is positioned by the locating pin 17**.

A slit 18 is formed in the locating pin 17 so as to be open in a diametrical direction of the locating pine 17, and the slit 18 reaches a portion of the flange 16 from a portion of the locating pin 17, as shown in FIG. 4.

As shown in FIG. 2, a clamp arm 21 is accommodated in the slit 18, and the clamp arm 21 becomes swingable between a clamp position as shown by a solid line in FIG. 2 and an escape position as shown by a double-dot line in FIG. 2, the clamp position being a position where a clamp piece 22 which is at a tip of the clamp arm 21 protrudes from the slit 18 to clamp the panel material P between the clamp arm 21 and the workpiece supporting face 15, and the escape position being a position where the clamp piece 22 enters into the slit 18.

A driven rod 24 is assembled axially reciprocably in a through hole formed in a partition wall 23 fixed in the coupling case 12 configuring the workpiece supporting stand 10, and a base end of the clamp arm 21 is linked to the driven rod 24 by a coupling pin 25 fixed to a tip of the driven rod 24. The driven rod 24 reciprocates between a retreat-limit position corresponding to the clamp position of the clamp arm 21 and an advance-limit position corresponding to the escape position of the clamp arm 21. A cam groove 26 is formed in the clamp arm 21, and a cam pin 27 penetrating the cam groove 26 is fixed to the fixing pedestal 11. The cam groove 26 includes a straight section **26*a* formed in parallel with a longitudinal direction of the clamp arm 21, and an incline section 26***b* formed so as to incline from a base end portion of the straight section 26*a*. Accordingly, when the straight section 26*a* slides along the cam pin 27 according to the driven rod 24 moving toward the retreat-limit position, the clamp piece 22 protrudes from the slit 18 to the outside. For this reason, as shown by the double-dot line in FIG. 2, as the driven rod 24 moves toward the advance-limit position, the incline section 26*b* approaches the position of the cam pin 27 so that the clamp arm 21 is at the escape position of entering into the slit 18.

A gear box 31 formed into a rectangular solid shape as a whole is attached to the base end of the coupling case 12 configuring the workpiece supporting stand 10, and the gear box 31 includes a main body portion 31*a*, a bottom wall portion 31*b* fixed to a bottom face of the main body portion 31*a*, and a top wall portion 31*c* fixed to an upper face of the main body portion 31*a*. In the gear box 31, a driving rod 32 is coaxial with the driven rod 24 so as to be mounted axially reciprocably between the advance-limit position and the retreat-limit position, and simultaneously a cam block 33 is reciprocably mounted in a direction approximately perpendicular to the driving rod 32 and in a direction of intersecting the driving rod 32. The cam block 33 reciprocates so as to be guided, as shown in FIG. 2, by two roller bearings 34 with which an upper face of the cam block 33 in shown FIG. 2 contacts and by two roller bearings 35 with which a lower face of the cam block 33 in FIG. 2 contacts, and simultaneously so as for both side faces of the cam block in FIG. 3 to contact with and be guided by inner faces of the gear box 31. Incidentally, the driving rod 32 and the driven rod 24 are coaxial with each other, but if both the rods reciprocate in the same direction, their centers may be deviated from each other.

A slit 36 is formed, as shown in FIGS. 2 and 3, in the cam block 33 so as to penetrate vertically, and the driving rod 32 is provided with a holder 37 assembled in the slit 36. Engagement cams 39 with roller shapes are rotatably mounted on both end portions of a supporting pin 38 fixed to the holder 37. The engagement cam 39 is assembled in a cam groove 40 formed in the cam block 33 so that the cam groove 40 penetrates the cam block 33 in a width direction of the cam block 33, whereby an inner peripheral face of the cam groove 40 serves as a cam face 41 contacting with the engagement cam 39. The cam groove 40 is inclined along a moving direction of the cam block 33 and the cam block 33 moves between a clamp position shown by a solid line in FIG. 2 and an unclamp position shown by a double-dot line in FIG. 2. When the cam block 33 is at the clamp position, the engagement cam 39 is, as shown in FIG. 2, at the farthest position separated from the driven rod 24, and the driving rod 32 is driven to the retreat-limit position at this time. Meanwhile, when the cam block 33 is at the unclamp position, the engagement cam 39 is at the nearest position approaching to the driven rod 24, and the driving rod 32 is at the advance-limit position. Formed in the cam face 41 is a lock face 41*a* for stopping movement of the driving rod 32 when the cam block 33 is at the clamp position. The lock face 41*a* is directed in a direction approximately perpendicular to the axial direction of the driving rod 32. When the engagement cam 39 contacts with the lock face 41*a*, movement of the engagement cam 39 is restricted so that the driving rod 32 becomes in a locked state.

A cylindrical box body 42 is assembled axially movably in the coupling case 12, and a tip of the driving rod 32 is fixed to a bottom wall portion of the box body 42. A lid member 43 is fixed to the box body 42 by screws, so that an accommodating box 44 is formed by the box body 42 and the lid member 43. A rear end portion of the driven rod 24 penetrating the lid member 43 enters into the accommodating box 44, and a compression coil spring 45 serving as a spring member is assembled in the accommodating box 44 so that its both end portions contact with a flange 24*a* provided at the rear end of the driven rod 24 and with the lid member 43.

A reciprocating stroke of the driving rod 32 driven by the cam block 33 is set slightly longer than a reciprocating stroke of the driven rod 24 coupled to the driving rod 32. Therefore, before the cam block 33 reaches the clamp position as shown in FIG. 2, the clamp piece 22 of the clamp arm 21 contacts with the panel material P, and the driven rod 24 is at the retreat-limit position. Subsequently, when the driving rod 32 moves up to the retreat-limit position, retreating movement of the driven rod 24 is restricted due to contact between the clamp arm 21 and the panel member P, so that the driven rod 24 moves in a direction of being separate relatively to the driving rod 32. That is, only the driving rod 32 moves axially, and the compression coil spring 45 is contracted. In FIG. 2, a stroke where only the driving rod 32 moves axially to contract the compression coil spring 45 is denoted by the numeral reference "S".

Thereby, when the driving rod 32 is at the retreat-limit position, the engagement cam 39 contacts with the lock face 41*a* so that the driving rod 32 is held by the cam block 33. At this time, a clamping force is applied to the clamp arm 21 by the compression coil spring 45 via the driven rod 24. Further, since the compression coil spring 45 has a contraction stroke which is the stroke S in magnitude, a plurality of kinds of panel members P different in thickness can be clamped reliably. Incidentally, when a tensile coil spring is used as a spring member to be mounted between the driving rod 32 and the driven rod 24, the driving rod 32 and the driven rod 24 can be coupled to each other without using the accommodating box 44, and simultaneously a clamping force can be applied to the clamp arm 21 via the driven rod 24 when the driving rod 32 is at the retreat-limit position.

A rack gear 46 is attached to the cam block 33 by a pin 47, and the rack gear 46 extends, as shown in FIG. 3, in a moving direction of the cam block 33. As shown in FIG. 3, guide rollers 48 rotatably mounted on the gear box 31 contact with a back face of the rack gear 46 so that movement of the rack gear 46 is guided by the guide rollers 48. A teeth face of the rack gear 46 meshes with a pinion gear 49, so that the rack gear 46 is driven by the pinion gear 49. An electric motor 50 is assembled in the gear box 31 in order to drive the cam block 33 via the rack gear 46 between the clamp position and the unclamp position, so that rotation of a main shaft 52 of the electric motor 50 is transmitted to the pinion gear 49 via a reduction gear mechanism 51 provided with three-stage reduction gear pairs.

The reduction gear mechanism 51 has a small gear 52*a* attached to the main shaft 52 of the electric motor 50, and a large gear 53*a* of a gear shaft 53 rotatably mounted to the gear box 31 via a bearing meshes with the small gear 52*a*, so that the reduction gear pair is configured by the small gear 52*a* and the large gear 53*a*. A small gear 53*b* provided on the gear shaft 53 meshes with a large gear 54*a* of a gear shaft 54 rotatably mounted to the gear box 31 via a bearing, so that a second-stage reduction gear pair is configured by the small gear 53*b* and the large gear 54*a*. A small gear 54*b* provided on the gear shaft 54 meshes with a large gear 55*a* of a gear shaft 55, which is rotatably mounted to the gear box 31 via a bearing and is provided with a pinion gear 49, so that a final-stage reduction gear pair is configured by the small gear 54*b* and the large gear 55*a*. The electric motor 50 is a pulse motor, and when the pinion gear 49 is rotated while the rotation of the electric motor 50 is reduced using the reduction gear mechanism 51 provided with the three-stage reduction gear pairs by driving the electric motor 50, the cam block 33 is reciprocated between the clamp position and the unclamp position via the rack gear 46 meshing with the pinion gear 49. A reciprocating stroke of the cam block 33 is set according to the number of pulses supplied to the electric motor 50.

The respective large gears 53*a*, 54*a*, and 55*a* are disposed, as shown in FIG. 3, in the gear box 31 so as to be shifted in a longitudinal direction of the gear box 31, so that the three-stage reduction gear pairs can be assembled in the gear box 31 without enlarging a width dimension of the gear box 31.

When the cam block 33 is at the clamp position by driving the electric motor 50, the engagement cam 39 is engaged with the lock face 41*a*. Therefore, application of a clamping force to the panel material P can be continued via the clamp arm 21 without supplying electric power to the electric motor 50, so that energy efficiency can be improved in comparison with a case where the clamping force is applied by motor torque. Even if power supply is stopped, the clamping force can be maintained. Accordingly, when the positioning and clamping apparatus is equipped with the conveying truck to convey the panel materials by the conveying truck, the panel materials can be each put in a clamped state without supplying electric power to the conveying truck from the outside.

Two photo sensors 56 and 57 are provided to the gear box 31 in order to detect arrival of the cam block 22 at the clamp position and arrival thereof at the unclamp position. Each of the photo sensors 56 and 57 detects a sensor dog 58 provided to the cam block 33 to find the position of the cam block 33. In FIG. 2, the sensor dog 58 is at a position of the photo sensor 57, and the photo sensor 57 detects that the cam block 33 has arrived at the clamp position.

The main shaft 52 of the electric motor 50 is such that its tip portion is attached to the small gear 52*a;* its rear end portion opposite to the tip portion protrudes from a motor case; and the rear end portion protrudes into a through hole 61 formed in the top wall portion 31*c* of the gear box 31. For this reason, the rear end portion of the main shaft 52 is exposed to the outside via the through hole 61. A tool engagement groove 62 is formed in the exposed rear end portion, so that the main shaft 52 can be manually rotated by causing a rotating tool such as a slotted screwdriver to be engaged with the tool engagement groove 62. Similarly, a base end portion of the gear shaft 53 protrudes into a through hole 63 formed in the bottom wall portion 31*b* of the gear box 31, and is exposed to the outside via the through hole 63. A tool engagement groove 64 is formed in the exposed base end portion, so that the gear shaft 53 can be manually rotated by causing the rotating tool to be engaged with the tool engagement groove 64.

A description will be made of a clamping procedure of the panel materials P using the above-mentioned electric positioning and clamping apparatus. When this positioning and clamping apparatus is attached to the welding stage of the automobile manufacturing line to position and clamp the panel materials P configuring an automobile body, the positioning and clamping apparatus is equipped with the welding stage by bolts attached to the attaching holes 59 formed in the pedestal plate 11*a*. The plurality of positioning and clamping apparatuses are equipped with the welding stage, and the positioning holes H fitted into the locating pins 17 are formed in the panel material P in advance so as to correspond to the locating pins 17 of each of the positioning and clamping apparatuses.

Before the panel material P is conveyed into the welding stage, the cam block 33 is set at the unclamp position as shown by the double-dot line in FIG. 2 by the electric motor 50. Under such a situation, the clamp arm 21 is, as shown by the double-dot line in Figure, at the escape position of entering into the slit 18 of the locating pin 17. At this situation, the panel material P is conveyed into the welding stage and is placed on the workpiece supporting face 15 of the workpiece supporting stand 10. Thereby, the locating pins 17 are fitted into the positioning holes H of the panel material P. In FIG. 2, a state where two panel materials P have been positioned is shown.

When the electric motor 50 is driven in a state of contacting the panel material P with the workpiece supporting face 15, the rack gear 46 is driven via the reduction gear mechanism 51 so that the cam block 33 is driven from the unclamp position to the clamp position in a direction of intersecting the driving rod 32. Thus, when the cam block 33 is driven up to the clamp position, the driving rod 32 is driven by the cam face 41 from the advance-limit position to the retreat-limit position via the engagement cam 39, whereby the driven rod 24 coupled to the driving rod 32 is driven from the advance-limit position to the retreat-limit position. Thereby, the clamp piece 22 of the clamp arm 21 coupled to the driven rod 24 protrudes from the locating pin 17 to the outside so that the panel material P is clamped by the workpiece supporting face 15 and the clamp piece 22.

When the driving rod 32 is moved near the retreat-limit position, the clamp piece 22 contacts with the panel material P so that the clamp arm 21 is at the clamp position, and the driven rod 24 is at the retreat-limit position. Subsequently, when the driving rod 32 is driven up to the retreat-limit position which is a distance corresponding to the stroke S, the accommodating box 44 is moved by the driving rod 32 so that the compression coil spring 45 is contracted and deformed. Thereby, a spring force of the compression coil spring 45 is transmitted to the clamp arm 21 via the driven rod 24 so that the clamping force is applied from the clamp arm 21 to the panel material P. When the driving rod 32 is at the retreat-limit position, the engagement cam 39 contacts with the lock face 41*a* of the cam face 41, so that the driving rod 32 is maintained in a fixed state without assembling any brake member in the electric motor 50 and without supplying electric power to the electric motor 50. However, the present invention may have a structure in which a small current is supplied to the electric motor 50 so that an external force for holding the cam block 33 at the clamp position is applied by the electric motor 50.

Thus, welding work is carried out to the panel material P under a state where the panel material P has been clamped by the clamp arm 21. After the welding work is terminated, the clamp arm 21 is returned back to the escape position shown by the double-dot line in FIG. 2 by reversing the electric motor 50, and the panel material P is conveyed to the next step.

As described above, a case where the electric positioning and clamping apparatus is disposed on the welding stage in the automobile manufacturing line has been explained, but the positioning and clamping apparatus may be equipped with the conveying truck or be attached to a tip of a robot arm.

The present invention is not limited to the above-mentioned embodiment, and may be variously modified and altered within a scope of not departing from the gist of the present invention. For example, a worm, a worm wheel, and the like may be used as the reduction gear mechanism 51. The electric motor 50 is not limited to a pulse motor, and may be a DC motor or the like.

What is claimed is:

1. An electric positioning and clamping apparatus comprising:

a workpiece supporting stand having, at its tip, a workpiece supporting face contacting with a panel material;

a locating pin attached to the workpiece supporting stand so as to protrude from the workpiece supporting face, and fitted into a positioning hole formed in the panel material;

a clamp arm accommodated in a slit, which is formed in the locating pin so as to be open in a diametrical direction of the locating pin, the clamp arm being swingable between a clamp position where the clamp arm protrudes from the slit to clamp the panel material between the workpiece supporting face and the clamp arm and an escape position where the clamp arm enters into the slit;

a driven rod mounted to the workpiece supporting stand so as to be reciprocable axially between a retreat-limit position corresponding to the clamp position of the clamp arm and an advance-limit position corresponding to the escape position of the clamp arm, a tip of the driven rod being coupled to the clamp arm;

a driving rod mounted in a gear box attached to the workpiece supporting stand so as be reciprocable axially between the retreat-limit position and the advance-limit position, the driving rod being coupled to a rear end of the driven rod;

a spring member mounted between the driven rod and the driving rod, and applying a clamping force to the clamp arm via the driven rod when the driving rod is at the retreat-limit position;

a cam block assembled in the gear box so as to be reciprocable in a direction of intersecting the driving rod, having a cam face contacting with an engagement cam attached to the driving rod, and causing the driving rod to be driven between the retreat-limit position and the advance-limit position; and an electric motor assembled in the gear box, and causing the cam block to reciprocate, via a reduction gear mechanism, between a clamp position corresponding to the retreat-limit position and an unclamp position corresponding to the advance-limit position.

2. The electric positioning and clamping apparatus according to claim 1, further comprising a lock face formed in the cam block, the lock face restricting movement of the engagement cam when the cam block drives the driving rod up to the retreat-limit position.

3. The electric positioning and clamping apparatus according to claim 1, wherein the spring member is a compression coil spring assembled between an accommodating box fixed to the driving rod and a flange provided to an end portion of the driven rod inserted into the accommodating box.

4. The electric positioning and clamping apparatus according to claim 1, wherein the reduction gear mechanism is plural-stage reduction gear pairs for reducing rotation of the electric motor.

5. The electric positioning and clamping apparatus according to claim 4, wherein a rack gear meshing with a pinion gear provided at a final stage among the plural-stage reduction gear pairs is attached to the cam block.

6. The electric positioning and clamping apparatus according to claim 2, wherein the spring member is a compression coil spring assembled between an accommodating box fixed to the driving rod and a flange provided to an end portion of the driven rod inserted into the accommodating box.

7. The electric positioning and clamping apparatus according to claim 2, wherein the reduction gear mechanism is plural-stage reduction gear pairs for reducing rotation of the electric motor.

* * * * *